Feb. 6, 1940.  A. E. ISCHINGER  2,189,650
FABRIC INSPECTION DEVICE
Original Filed March 22, 1937  7 Sheets-Sheet 1

INVENTOR:
Alfred E. Ischinger
ATTORNEY.

Feb. 6, 1940.  A. E. ISCHINGER  2,189,650
FABRIC INSPECTION DEVICE
Original Filed March 22, 1937  7 Sheets-Sheet 2

INVENTOR:
Alfred E. Ischinger
ATTORNEY.

Feb. 6, 1940.  A. E. ISCHINGER  2,189,650
FABRIC INSPECTION DEVICE
Original Filed March 22, 1937   7 Sheets-Sheet 4

INVENTOR:
Alfred E. Ischinger
ATTORNEY.

Feb. 6, 1940. A. E. ISCHINGER 2,189,650
FABRIC INSPECTION DEVICE
Original Filed March 22, 1937 7 Sheets-Sheet 6

INVENTOR:
Alfred E. Ischinger
ATTORNEY.

Patented Feb. 6, 1940

2,189,650

UNITED STATES PATENT OFFICE 2,189,650

FABRIC INSPECTION DEVICE

Alfred E. Ischinger, Mount Penn, Pa., assignor to Textile Machine Works, Wyomissing, Pa., a corporation of Pennsylvania Application March 22, 1937, Serial No. 132,407
Renewed December 23, 1939

15 Claims. (Cl. 223—77)

My invention relates to fabric inspection devices, and more particularly to the type including a stationary element extending from the surface of a form over which a fabric portion to be inspected may be placed, and cooperatively associated movable fabric expanding means.

Inspection devices, and particularly hosiery inspection forms, have been of various types, such as those comprising a system of sectional frames and toggles, to which the features of my invention may be applied, but a device for which one embodiment of the invention is particularly adapted is in the form of a smooth pole, at least in its contracted or smallest-diametered condition, so that stockings such as ladies' delicate sheer knit full fashioned stockings can be slipped onto the form with substantially maximum facility and minimum danger of injury. In the latter feature the form of the pole type is an improvement over those constructed of sectional frames and toggles, as above mentioned.

A form of the pole type for which one arrangement of the invention is adapted has, in its smallest contracted state for receiving a stocking, a practically uninterrupted smooth outer surface which is provided by a longitudinally divided shell of thin sheet material mounted on a longitudinally extending inner support.

The longitudinal divisions of the shell are radially movable by a longitudinally reciprocable member, which coacts with a system of pins and diagonally slotted members or cams.

The inner support is mounted at one end on a main base member, or head, containing suitable actuating means for reciprocating the above-mentioned member and moving the pole divisions laterally, so that the pole projects freely from this head to its toe end for free manipulation of the stocking in placing it thereon and removing it therefrom.

In operation, a stocking is slipped over the form and, when adjusted in position, the operator, by manipulation of a foot pedal, expands the stocking to inspect its various parts. In this expanded state, the operator may turn the pole about its longitudinal axis relative to the head, so that all parts of the stocking may be conveniently and effectively inspected.

By reason of the irregular shape of a stocking around the instep and heel pocket, or the angularity of the foot relative to the leg portions, a straight pole, although desirable from the standpoint of receiving and discharging the stocking, is not adapted to proper expansion of the heel pocket and instep portions, in view of which it has heretofore been provided with a movable heel element that could be moved from a position within, to a position beyond, the outline of the pole into the heel pocket of a stocking for distending or expanding the latter.

The prior-art devices having the movable heel elements have several disadvantages, such as limitations as to the shape of the heel element by reason of the fact that it is movable, and, in one position, is required to lie within the outline of the pole form. Another disadvantage resides in the complication of the structure for effecting adjustment between the heel and toe parts, the undue amount of time necessary in effecting such adjustment, and the dependence of the adjustment upon the eye or judgment of the operator. Another disadvantage of the movable heel element form resides in the fact that, in retracted position, it is disposed within the outline of the pole form and allows no effective or definite adjustment of the heel pocket of a stocking relative to it until the actual expanding operation occurs.

It is an object of my invention to overcome the above-mentioned and other disadvantages of the prior art devices and to provide a hosiery inspection device having a stationary member, such as a heel element whereby to obtain advantageous results not possible with a movable heel or other element of the above-mentioned kind.

Another object is to simplify, facilitate, and shorten the time of, adjusting the device to stockings of different sizes and to enable such adjustments to be made in direct positive steps preventing error in placing a shaped fabric portion support, such as the heel element, relative to another portion of the device, such as the toe end.

Another object of my invention is to cause the shaped fabric positioning portion, such as the heel element of the form, to function as a direct positioning guide whereby in mounting a stocking on the pole, the position of the shaped fabric portion is instantaneously observable, and manipulation of the shaped fabric portion may be quickly effected to place it relative to the cooperatively shaped element.

Another object of my invention is to provide the above-mentioned form, having the fixed element, with a recess or depression, at a position opposite the element at a location corresponding to the position of the stocking instep relative to the heel pocket, to compensate for the presence of the element and thereby enable fabrics such as stockings to be slipped on and off the form as readily as though the fixed element were not present.

Another object of my invention is to provide a novel structure for selectively distributing the tension of an expansion form on the fabric, as by having the tension selectively distributed along a stocking, particularly for a length thereof in a portion corresponding to the instep portion in a form having the fixed element cooperating with the heel pocket.

A further object includes the provision of a device of the above-indicated character, for effecting better visibility of the fabric by means of light or contrasting colors.

With these and other objects in view, which will become apparent from the following detailed description of the illustrative embodiment of the invention shown in the accompanying drawings, my invention resides in the novel elements, features of construction and arrangement of parts in cooperative relationship as hereinafter more particularly pointed out in the claims.

Referring to Figs. 1, 2, 3 and 4, a form F is provided for supporting a fabric S including a fashioned or shaped portion H of a contour or character other than a body L of the fabric adjacent thereto, such as a pocket protruding from a plane, cylindrical or other regular area of the fabric. The form F comprises an element E mounted on a support 34 in stationary relation thereto and projecting from the general surface thereof for contacting the portion H of the fabric.

The form is adapted to receive the fabric S with the shaped portion H relatively loosely disposed over the stationary element E, and another portion I of the fabric for cooperation with means M, including a presser unit P, in addition to means hereinafter set forth for expanding the fabric generally, or at a position opposite the element E, so that when the means M presses against the fabric portion I, the shaped fabric portion H is pulled into position on the stationary element E, and tension is applied to the fabric to expand the shaped fabric portion H over the element E in a predetermined manner by a predetermined amount.

In the form shown, the fabric S is of tubular formation extending entirely around the form in the zone of the portions H and I whereby, when the means M presses against the fabric portion I, the above mentioned positioning of the portion H on the stationary element E, the tension in the fabric and the expansion of the portion H on the element E are obtained. However, an equivalent effect may be obtained, as by extending fabric between the portions H and I about one side of the form and holding it at the other side of the form to provide an effect similar to the effect obtained with the tubular fabric, the invention contemplating the pulling and expanding of a shaped fabric over a stationary element at one portion of the fabric by pressing against an opposite portion of the fabric, or in addition to the general expansion of the fabric with means holding the fabric to produce such result.

Figure 5:
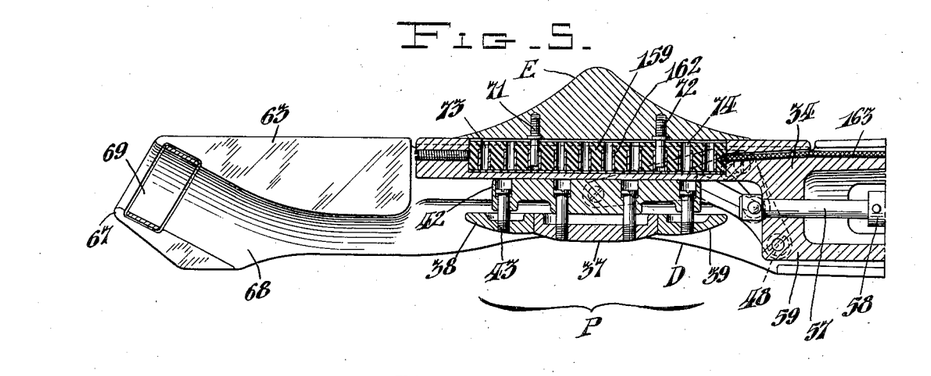
Fig. 5 is a vertical median plane section of a left-hand portion of Fig. 1, enlarged relative thereto, with the parts in position corresponding to the contracted condition of the form as in Figs. 1 and 3.
Figure 6:
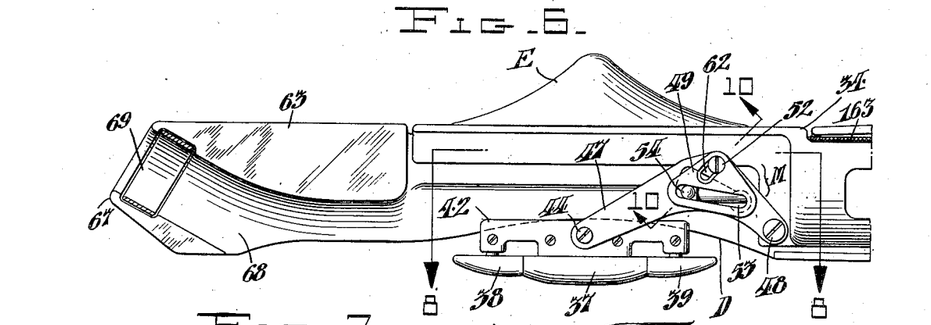
Fig. 6 is an elevational view of the portion of the form shown in Fig. 5, with the parts in position corresponding to the expanded condition of the form of Figs. 2 and 4.
Figure 7:
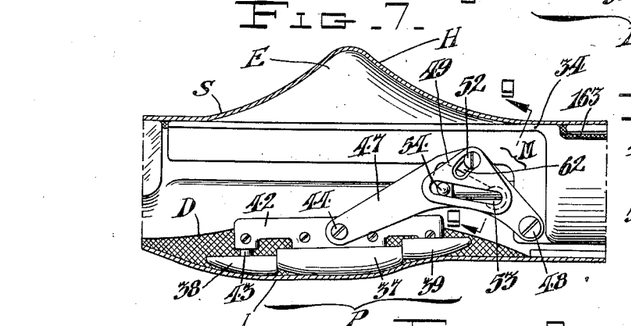
Fig. 7 is a view similar to Fig. 6, with the parts similarly in the expanded position, but with a stocking on the form and with certain members which operate in unison in different position relative to each other from their relative position of Fig. 6.
Figure 8:
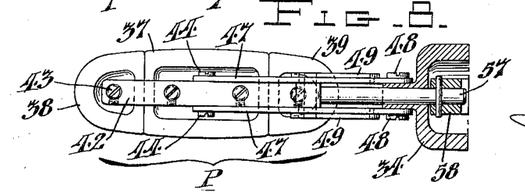
Fig. 8 is a view taken substantially along the line 8—8 of Fig. 6.

In the structure above set forth, the tension in the fabric can be selectively distributed by the means M through the use of a composite presser unit P, see also Figs. 5, 6, 7 and 8, comprising, in the example shown, component presser elements including a main or intermediate presser element 37 and auxiliary or end presser elements 38 and 39, the composite presser unit thus constituted being in the form of a pressure shoe having relatively movable parts represented by the elements 37, 38 and 39. These elements are adjustably mounted on a member 42, as by screws 43, such that the bottom line or surface of the shoe, as viewed in Fig. 6, for example, may be varied in contour, as indicated in Fig. 7, in accordance with the contour of different fabrics, or with different conditions prevailing when the fabrics are being inspected by the use of the invention, to distribute the fabric tension accordingly, this selective distribution, in the example given, occurring along the form and the fabric.

Also, by way of example, where the fabric S is tubular, or held at opposite portions, such as the heel pocket and instep of a stocking, a depression represented by curved line surfaces D is provided laterally opposite the stationary element E to compensate for the presence of the latter and allow the fabric to be slipped onto and from the form substantially as freely as though the stationary element E were not present.

The member 42 is pivotally supported by a pin 44 at the free end of a lever 47 formed of a pair of thin members acting as one lever which is pivoted by a pin 48 in the support 34.

Figures 9, 10:
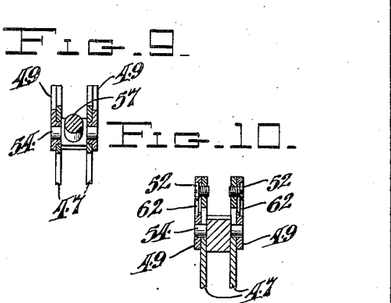
Fig. 9 is a detail sectional view taken along the line 9—9 of Fig. 7.
Fig. 10 is a sectional view taken along the line 10—10 of Fig. 6.

In the example as shown, the lever 47 is of substantially L-shape in vertical plane elevation with one leg sloping upwardly to the left from the pin 48 and the other leg sloping downwardly to the left from the top of the first leg to the pin 44. Each of a pair of triangular plates 49 is secured to a side or member of the lever 47 by a screw 52, and Fig. 10, has a diagonal slot 53 therein in which one end of a pin 54 is disposed, Fig. 9. The pin 54 is carried at one end of a rod portion 57 of a horizontal longitudinally reciprocable elongated actuator 58 journaled in a bearing 59 of the support 34, whereby in the contracted condition of the form, with the actuator 58 at its farthest position to the right as viewed in the drawings, the pressure unit or shoe P is held in contracted position as in Fig. 5. The latter position may be adjusted relative to the actuator by releasing the screw 52, which is disposed in a slot 62 in the plate 49 describing an arc about the axis of the pivot pin 48, moving the plate to place the screw 52 in a different portion of the arcuate slot and tightening the screw to fix the plate 49 relative to the lever 47. Thus, with the pin 54 fixed to the rod 57, which is journaled in the bearing 59, and with the pin 54 also in the diagonal slots 53, the pressure unit P will be held in any of a selection of contracted positions for movement to corresponding expanded positions.

Figure 1:
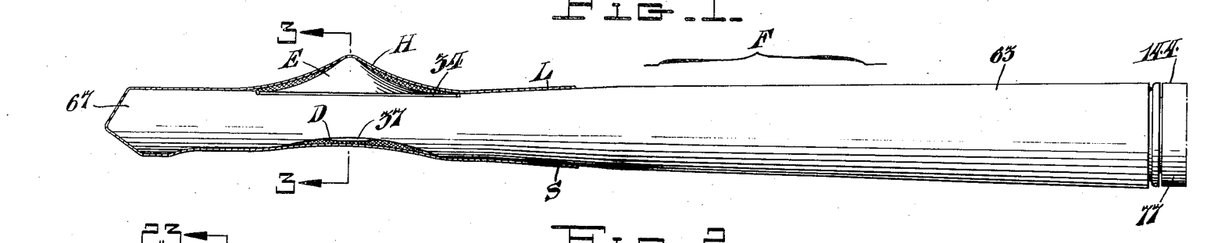
Figure 1 is a side elevation of a fabric inspection form embodying the invention, as utilized in the inspection of ladies' full fashioned stockings, with a portion of a stocking thereon before being expanded, and viewed from the position of the operator.
Figure 2:
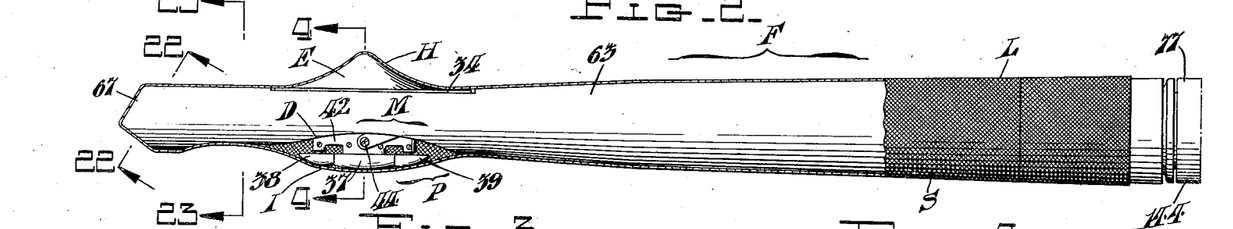
Fig. 2 is a view similar to Fig. 1 of the device thereof, with the form expanded, showing the welt and portions of the upper leg of the stocking in elevation.
Figure 3:
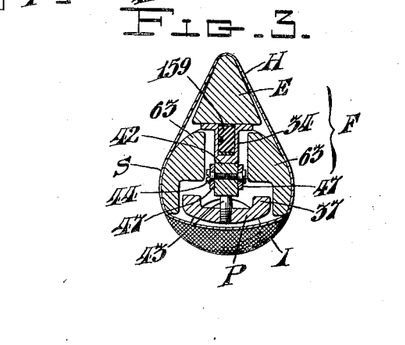
Fig. 3 is an enlarged cross sectional view, taken along the line 3—3 of Fig. 1, with the parts in the contracted position thereof.
Figure 4:
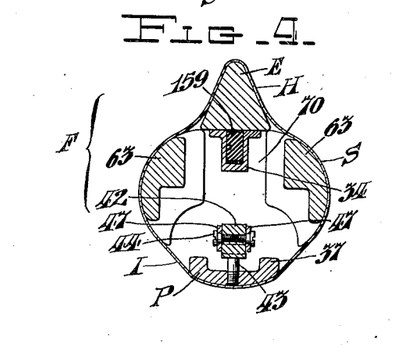
Fig. 4 is a view of the parts of Fig. 3 drawn to the same scale, but in expanded position corresponding to a section along the line 4—4 of Fig. 2.

The outer surfaces of the form F in the region of the element E and the unit P, in addition to the surface portions thereof on these members, are provided by members 63, see Figs. 3 and 4, at opposite sides of the support 34 which are movable relative to each other and to the support from the contracted form positions thereof of Fig. 3, to the expanded form positions thereof of Fig. 4, thus providing lateral expansion of the fabric, in addition to the expansion of the shaped fabric portion H on the element E provided by the pressure on the opposite portion I of the fabric by the unit P, which lateral expansion also serves to modify or augment the expansion effected by the unit P. The curved surface D, being on these members 63, when the unit P is in its contracted position and the fabric S, in tubular form, is drawn longitudinally over the form, the fabric portion I, depending upon its diameter, may be drawn onto, or biased toward, the upwardly extending depression defined by the surfaces D to compensate for the presence of the element E and facilitate slipping the fabric on and off the form.

As above described, the invention is of general application, but, as shown, merely by way of one specific practical application, it is adapted to the inspection of ladies' fine silk full fashioned stockings, in which case the form F is then a hosiery form, the fabric S is a stocking, the shaped fabric portion H is, in this particular example, a heel pocket, although it can be operated in other applications such as at the knee of the stocking, the fabric portion I is an instep portion of the stocking, the unit P presses against the instep fabric portion I, and the lateral expansion members 63 define portions of the stocking leg and toe.

Figure 22:
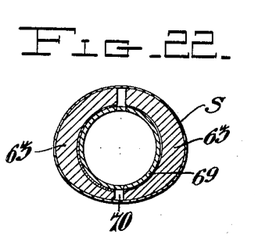
Fig. 22 is a detail section taken along the line 22—22 of Fig. 2.
Figure 23:
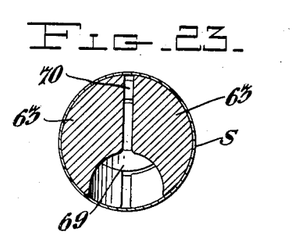
Fig. 23 is a detail section taken along the line 23—23 of Fig. 2.

As indicated, the toe end 67 of each of the members 63 projects to the left, as seen in Figs. 1, 2, 5 and 6; these members 63 constituting longitudinal half divisions of the entire leg and foot form, and a recess 68 of usual character being provided in the toe end for drawing a stocking therethrough from the lower rear right hand end of the recess 68 and then along the form to the right from the forward upper end of the recess 68. A ring 69, see Figs. 15, 22 and 23 is associated with one of the laterally movable half divisions 63 to guide the stocking through the recess 68 and prevent it from slipping through a slot 70 or axial space between the longitudinally divided halves, which slot varies in width upon expansion and contraction of the form.

The stationary element E, as better seen in Fig. 5, is adjustable, in this case being adjustable along the form, by being mounted on the support 34 by means of a pin or plug 71 of small diameter and a pin or plug 72 of larger diameter cooperating with small and large apertures or sockets 73 and 74, respectively, whereby the pins cannot be put in the wrong sockets or the element E mounted in any but one of a selection of intended positions. As a support and expander for the shaped fabric portion H, the element E, when operating with the portion H as a heel pocket of a stocking, is thereby adjustable relative to the toe end 67 to adjust the device to stockings having feet of different sizes.

Figure 11:
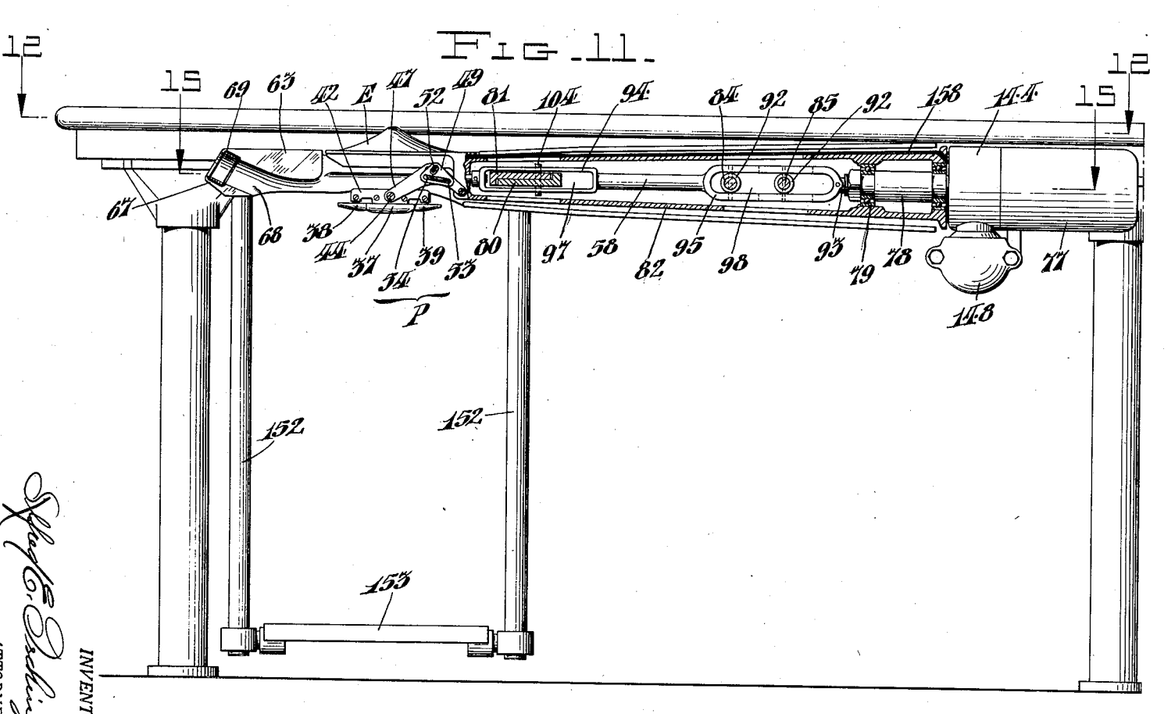
Fig. 11 is a view of the form of Fig. 1 partially in longitudinal section and partially in front elevation, showing a head at the right-hand end of the form by which the form is supported, a table on which the head is mounted, and an operating treadle.
Figures 12, 13, 14:
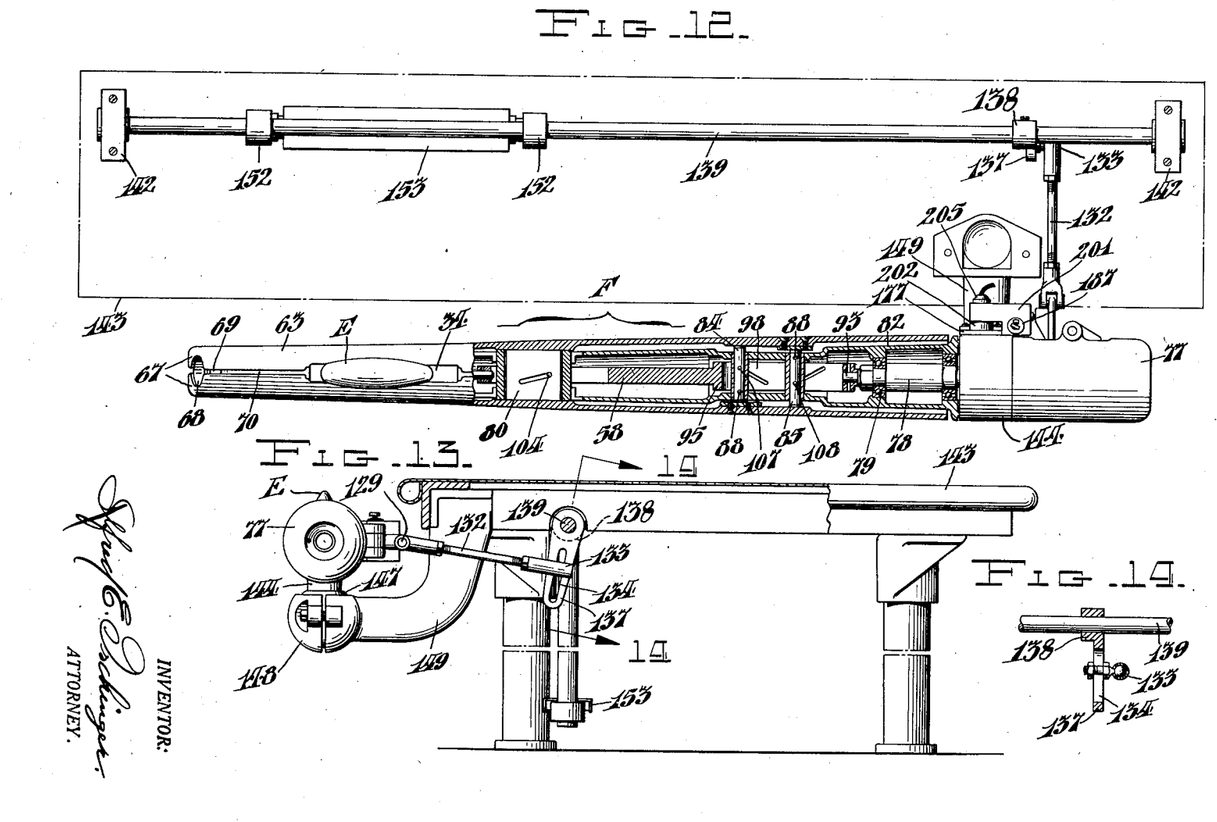
Fig. 12 is a view taken substantially along the line 12—12 of Fig. 11, parts being broken away for purposes of illustration.
Fig. 13 is an end elevation, parts being broken away, of the structure of Fig. 11, viewed from the right.
Fig. 14 is a view taken substantially along the line 14—14 of Fig. 13.
Figure 15:
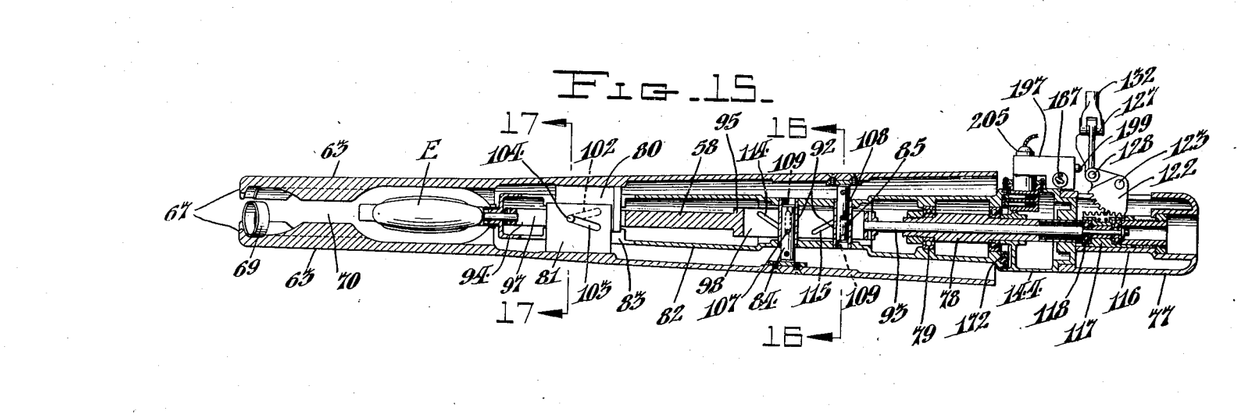
Fig. 15 is a horizontal median plane section of the form taken along the line 15—15 of Fig. 11.

As better shown in Figs. 11, 12 and 15, means for supporting and actuating the mechanism of the invention above set forth, comprises a head 77 from one end of which projects a relatively short post 78 fixed in head 77 (Fig. 18) and on which are mounted ball bearings 79 disposed in one end of, and adapted to rotatably support, an elongated hollow center post 82 which is axially aligned with, and adapted to rotate about, the axis of the short post 78.

The complete form F, on which the stocking S is placed for inspection, is of a substantially entirely enclosed pole type presenting a fabric engaging and supporting surface to substantially the entire stocking. The form F comprises an expansible shell made up of the members 63 surrounding the rotary hollow post 82 and extending from a position closely adjacent to the head 77, substantially as a continuation of the latter in its lengthwise direction, to a position beyond the opposite or outermost end of the hollow post 82. The form F, in its smallest contracted state, as shown in Fig. 12, is generally of substantially circular cross-sectional contour, and in lengthwise direction, convergingly tapers gradually from its larger end adjacent to the head 77 to a portion of smaller diameter beyond the outer end of the hollow post 82.

The longitudinal divisions or portions 63 extend the entire length of the pole from its larger end next to the head 77 to its toe end 67, and are movable laterally or radially relative to each other.

The longitudinal pole divisions 63 are supported at a position intermediate the ends thereof by plates 80 and 81 fixed to the respective shell portions and projecting radially inwardly toward each other in parallel-plane overlapping engagement for sliding movement laterally or radially of the pole on, and relative to, each other in slots 83 of the hollow post 82.

The shell portions 63 are further supported at a position between the position of the plates 80 and 81 and the position of the head 77, by transversely extending rods 84 and 85 pivoted at the outer ends to the shell portions 63, respectively, as by pivot connections 88. Each of the rods 84 and 85 is longitudinally slidably mounted in a bearing 92 supported by, and extending transversely to, the hollow post 82.

Lateral or radial relative movement of the longitudinal shell divisions is effected by the longitudinally reciprocable elongated actuator 58 mounted centrally in the hollow post 82 including a cylindrical rod portion 93 extending through the short fixed post 78 in longitudinal sliding relation thereto. The opposite end of the actuator 58 carries the cylindrical rod 57 longitudinally slidably mounted by the bearing 59 in the support portion 34 of the hollow post 82.

The actuator 58 is provided, intermediate its ends, with enlarged portions 94 and 95 having longitudinal slots 97 and 98, respectively. The plates 80 and 81 project oppositely into the slot 97 and are provided with diagonal slots 102 and 103, respectively, through which extends a pin 104. The ends of the pin 104 are fixed to walls of the enlargement 94 of the actuator 58 at opposite sides of the slot 97 whereby longitudinal movement of the actuator 58 causes the pin 104 to so move along the diagonal slots 102 and 103 as to move the plates 80 and 81, and consequently the shell divisions 63, radially or laterally of the pole or shell.

The transverse rods 84 and 85 are provided with pins 107 and 108, respectively, at right angles to the rods 84 and 85 in slots 109 in the bearings 92. The pins 107 and 108 have end portions in diagonal slots 114 and 115 in the actuator 58 at opposite sides of the slot 98 whereby longitudinal movement of the actuator 58 causes the pins 107 and 108 to so move along the diagonal slots 114 and 115 as to move the transverse rods 84 and 85 and consequently, the pole divisions 63, radially or laterally of the pole axis.

By moving the pole divisions 63 away from each other, the pole is expanded throughout its length to simultaneously expand all of the stocking points in addition to the expansion provided by the novel elements of my invention associated with the element E as hereinbefore set forth.

As shown in Fig. 15, the right-hand end of the actuator rod 93 is provided with a slide member 117 in a guide 116 fixed in position in the head 77. A structure including ball bearings 118 provides for rotative movement of the actuator 58 about its longitudinal axis relative to the slide member 117 and prevents longitudinal relative movement between the actuator and the slide member. A compression spring 119 (Fig. 13) surrounding the rod portion 93 of the actuator 58 between the fixed post 78 and the slide member 117 biases the actuator to the right, as viewed in Fig. 15, or toward the position which the actuator occupies in the collapsed or contracted condition of the pole form or shell F.

Movement of the actuator 58 in the opposite direction, or to the left as viewed in the drawings, to expand the form as above set forth, is effected by a gear wheel sector 122 pivotally mounted on a shaft 123 journalled by a portion of the head 77. The sector 122 cooperates with a rack 124 on the slide member 117 and projects through a slot in a side wall of the head 77 for movement about its pivot axis. A link 127, pivotally connected at one end to the sector 122 by a pin 128, has its other end pivoted by a pin 129 (Fig. 13) at right angles to the pin 128 in one end of a link 132. The other end of the link 132 is connected to a universal joint member 133, Figs. 13 and 14, adjustably mounted in a slot 134 extending along a lever 137, a hub 138 of which is mounted on a shaft 139. The shaft 139 is journaled in bearings 142 secured to the underside of a table 143.

The head 77, Fig. 13, is provided with a depending neck 144 having a ball head 147 at its lower end universally journalled in a split socket 148 on a bracket 149 secured to the underside of the table 143, this structure permitting the pole form to be fixed in any of several selective positions. The universal linkage between the gear wheel sector 122 and the shaft 139 provides for operation of the actuator 58 by the shaft 139 irrespective of the selected position of the pole provided by the ball and socket joint comprising the ball 147 and the socket 148.

Arms 152, Fig. 11, secured to the shaft 139 and depending therefrom, are bridged near the lower ends by a treadle 153, whereby rocking of the shaft 139 may be effected and the movement transmitted to the gear wheel sector 122 through the lever 137, the link 132 and the link 127.

In the general operation of the invention as a full fashioned stocking expander and inspection device, the parts may be initially conditioned in partially contracted position, or in fully contracted position, as indicated in Figs. 1, 3, 5, 12 and 13.

As viewed in Fig. 11, a stocking, turned inside out, is then inserted, welt end first, into the lower right hand end of the diagonal toe recess 68, and this welt end and upper leg portions are passed upwardly to the left, through the ring 69, and out of the upper left hand end of the recess 68. With only enough of the welt end of the stocking out of the upper left hand end of the recess 68 to permit handling, and the remainder of the stocking hanging beneath the form and the table top, the stocking is then peeled backwardly to the right over the pole form to place it on the form right side out, the stocking portion beneath the form being pulled upwardly through the recess 68 and onto the form, as better indicated in Fig. 2. In this action, by reason of the smooth contours and cooperative relations of the element E and the depression D, the stocking glides quickly and smoothly into position.

Figure 16:
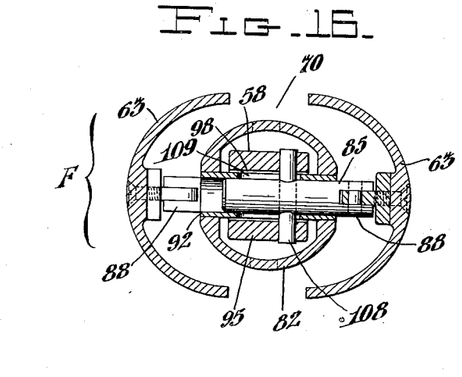
Fig. 16 is an enlarged sectional view, taken along the line 16—16 of Fig. 15, with the parts located as in the expanded condition of the form.
Figure 17:
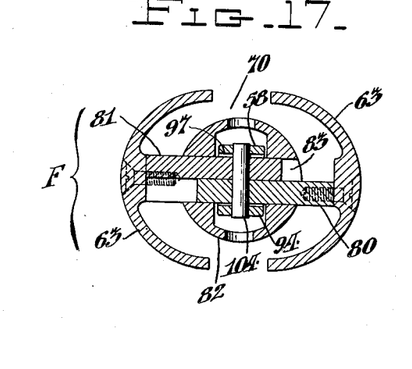
Fig. 17 is an enlarged sectional view, taken along the line 17—17 of Fig. 15, with the parts located as in the expanded condition of the form.

Pressure of the treadle to the right, or counterclockwise about the axis of the shaft 139, as viewed in Fig. 13, moves the lever 134 and the links 132 and 127 correspondingly to the right to move the gear wheel segment 122 clockwise as viewed, and to the position indicated, in Fig. 15. During this action, the pins 106, 107 and 104 move from the positions thereof in Fig. 12 to the positions thereof in Fig. 15, thus moving the pins 84 and 85 oppositely outwardly from each other, and the plates 80 and 81 oppositely outwardly from each other, to expand the form laterally as a whole, in which the longitudinal divisions 63 are in fully extended position, as seen also in Figs. 16 and 17.

Simultaneously with the above action, the pin 54 slides in the slot 53 to move the presser unit P from the position of Fig. 5 to the position of Fig. 6, during, or as a result of, all of which actions, the heel pocket H is first positioned on the stationary element E, the fabric is then further tensioned and the pocket H finally distended to the desired amount. Although in this instance, this effect is produced by the combined lateral stretching of the entire stocking and the local application of the presser P against the instep I, it is contemplated to operate the presser P alone, in other time relation to the lateral or general expansion, or other place relation to the general expansion mechanism.

After the above operation has been effected, the form may be freely rotated in each direction about its longitudinal axis relative to the head 77 for a complete and minute inspection of any and all parts of the stocking which are thus distended to expand the yarn loops to render them more clearly visible.

Figure 24:
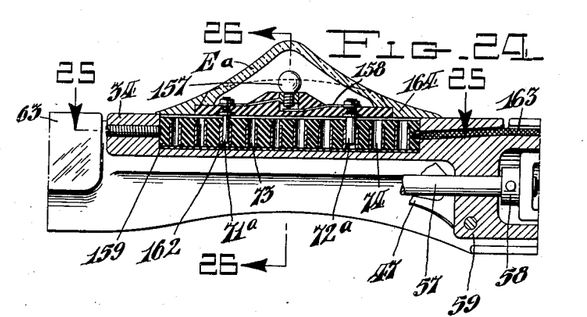
Fig. 24 is a view, similar to a portion of Fig. 5, of parts corresponding to parts thereof in a modified form of the invention.
Figure 25:
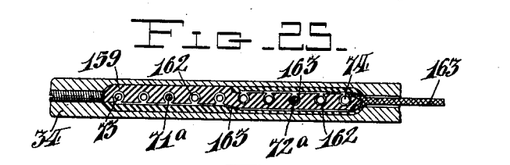
Fig. 25 is a view taken along the line 25—25 of Fig. 24.
Figure 26:
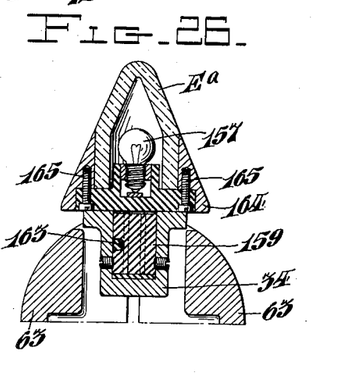
Fig. 26 is a slightly enlarged view taken along the line 26—26 of Fig. 24.

In the modification of the invention shown in Figs. 24, 25 and 26, a stationary element Ea, except that it is hollow, constructed of glass and interiorly illuminated, as by a pea lamp 57, is identical with the element E above set forth and similarly related to the other parts.

In this form, pins 71a and 72a of small and large diameter, respectively, correspond in the positioning functions thereof to the pins 71 and 72, respectively, but also serve as plug contact connectors for the terminals of the lamp 157 to which they are connected by conducting leads or wires 158, as seen in Fig. 24.

An insulating panel 159, Figs. 5 and 24, constituting an insert of the support 34 has openings or sockets for the pins 71, 71a, 72 and 72a, lined by thin conducting sleeves 162 connected to circuit conductors 163 which extend from the panel 159 through the form F on which the element E or Ea is mounted.

The element Ea which may be made to diffuse the light from the lamp 157 and give a uniform non-glaring light over the entire exposed area of the glass portion to facilitate inspection of the fabric thereon, may be secured in position, as by an element 164 and screws 165 shown in Fig. 26. This structure facilitates the removal of the glass portion of the element Ea for renewal of the lamp 157, for renewal of the element Ea or for substituting a glass element Ea of different color according to the color of the hosiery being inspected, local lighting or other conditions.

The elements E and Ea are interchangeably receivable by the support 34 such that, when the element E is employed, the panel 159 functions solely as a mechanical support for the element, but, when the element Ea is employed, the panel 159 functions not only as a mechanical support, but also as an electrical terminal board.

Referring particularly to Figs. 18, 19, 20 and 21, conductors 163 extend to slip rings 170 and 171 embedded in the surface of an insulating member 172 carried by the larger end of the hollow post 82 for cooperation, respectively, with brushes 173 and 174 mounted in an insulating block 177 in the head 77. From the brush 174, a conducting lead 178 extends directly to a supply line conductor 182, the associated line conductor 183 of which is connected through a conductor 184 to a three position switch 187 including a movable switch arm 188 for cooperation with stationary contact members 192 and 193.

When the switch arm 188 is engaged to the contact arm 192, a circuit is completed from the supply line conductor 183, through the conductor 184, the switch arm 188, the contact member 192, a conductor 194, a conductor 195, the brush 173, a slip ring 170, the conductors 163, the lamp 157, the slip ring 171, the brush 174, the conductor 178 and the supply line conductor 182, to illuminate the lamp 157 continuously.

When the switch arm 188 is engaged to the contact member 193, a circuit is completed from the supply line conductor 183, the conductor 184, switch arm 188, contact member 193, a conductor 196, a switch 197, the conductor 195, brush 173, slip ring 170, the conductors 163, the lamp 157, the slip ring 171, the brush 174 and the conductor 178 to the opposite line conductor 182.

Switch 197 comprises a spring biased plunger 198 having a ball head 199 for engagement by a lug 200 on the link 127, whereby, when the form is expanded lug 200 is moved away from head 199 and the plunger 198 is actuated by its spring to energize the circuit of the lamp 157, and when the form is contracted, the switch is opened. Thus, the operator has the choice of having the lamp on all the time, or to have the lamp illuminated only in response to operation of the expanding and contracting means. The third or intermediate portion of the switch arm 188 is the "off" or deenergized position.

Figures 18, 19:
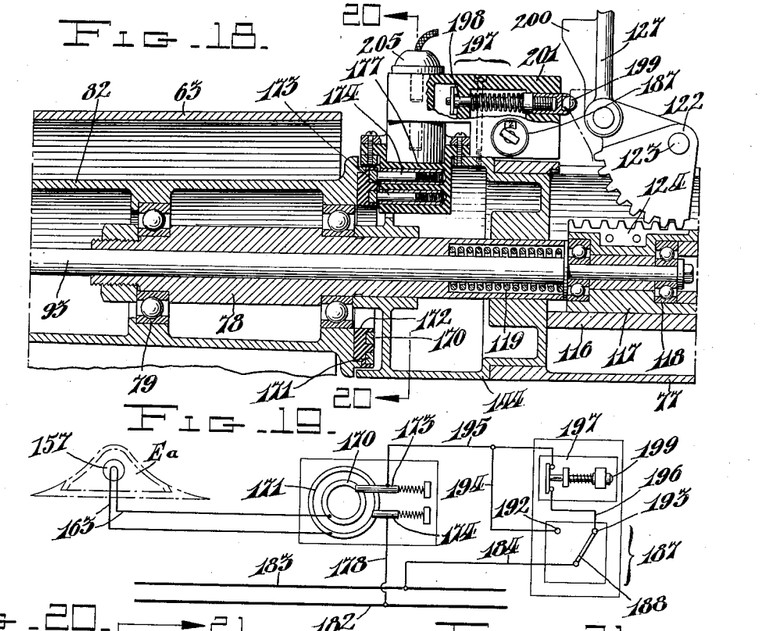
Fig. 18 is an enlarged view of a portion of the structure as seen at the right-hand end of Fig. 15, portions being broken away.
Fig. 19 is a diagram of electrical circuits and parts embodied in one form of the invention.
Figure 20:
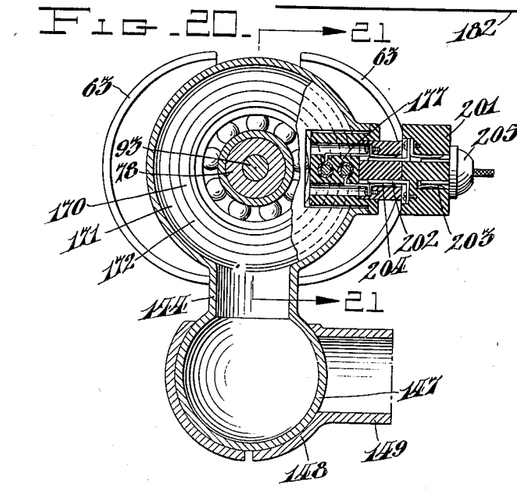
Fig. 20 is a view taken substantially along the line 20—20 of Fig. 18.
Figure 21:
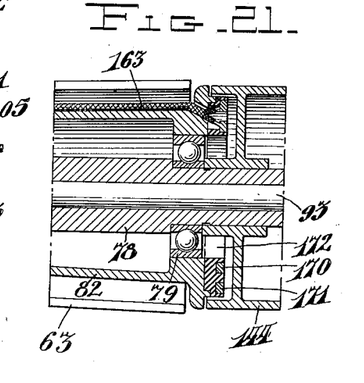
Fig. 21 is a view taken substantially along the line 21—21 of Fig. 20.

As seen in Figs. 18 and 19, the switches 187 and 197 are supported in an insulating block 201 having a plug portion 202 and socket portion 203. The plug portion 202 fits a socket 204 on the brush block 177 and the socket portion 203 is for the reception of a plug 205. By removing the block 201 from the head 77 to thereby remove the switches 187 and 197, the plug 205 can be inserted directly into the socket 204 on the brush block.

Figure 27:
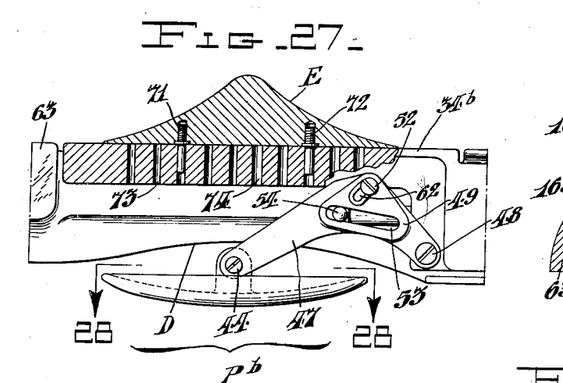
Fig. 27 is a view, similar to a portion of Fig. 6, of parts corresponding to parts thereof in a further modified form of the invention.
Figure 28:
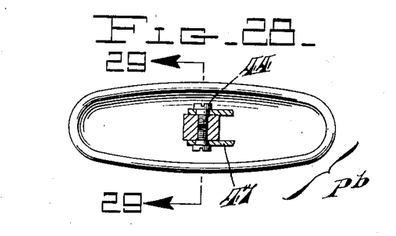
Fig. 28 is a detail view, taken along the line 28—28 of Fig. 27.
Figure 29:
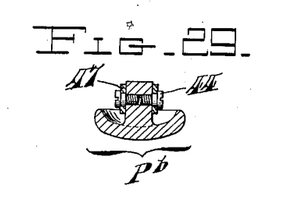
Fig. 29 is a view taken along the line 29—29 of Fig. 28.

In the form of the invention shown in Figs. 27, 28 and 29, in which parts corresponding to parts of the structure first above described are designated by corresponding reference characters, the structure is identical with the first described structure, except that a support 34b for the element E is for the mechanical support of such element only, and not to receive the electrically illuminated element Ea, and a presser unit Pb is made of one piece instead of the relatively adjustable presser elements 37, 38 and 39 of Figs. 5, 6 and 7.

Of course, the improvement specifically shown and described by which I obtain the referred to and other advantageous results, can be changed and modified in various ways without departing from the invention herein disclosed and hereinafter claimed.

I claim:

1. A hosiery inspection device including a stationary inner support, a longitudinally divided outer form for supporting a stocking, the divisions of which form have end portions adapted to engage the toe end of a stocking, said divisions being laterally movably mounted on said support, an element stationarily mounted on said support having a portion between adjacent of said divisions and a heel portion projecting laterally from the surface of the form rearwardly of, and in spaced relation to, the toe end thereof for receiving the heel pocket of the stocking, a movable instep pressure member, and means for moving said divisions laterally against the stocking and also moving said pressure member against an instep portion of the stocking laterally opposite said element to pull the heel pocket into position on said element and apply tension to the fabric to expand the heel pocket a predetermined amount.

2. A hosiery inspection device including a stocking supporting form having an end portion adapted to engage the toe end of a stocking, a heel element stationarily mounted on the form projecting laterally from the surface of the form rearwardly of, and in spaced relation to, the toe end portion, means in the form including an actuating member and instep pressure elements simultaneously movable by the actuating member against an instep portion of the stocking opposite said stationary element to pull the heel pocket into position on said stationary element and apply tension to the fabric to expand the heel pocket a predetermined amount, and means for selectively distributing the tension of said simultaneously movable elements on the stocking along the form including means for adjusting said simultaneously movable elements relative to each other and to said actuating member.

3. A hosiery inspection device including a stocking supporting form having an end portion adapted to engage the toe end of a stocking, an element stationarily mounted on the form projecting laterally from the surface of the form rearwardly of, and in spaced relation to, the toe end portion for receiving the heel pocket of the stocking, and actuating means including an actuating member and an element mounted on said actuating member for movement thereby and relative thereto opposite said stationary element for self adjusting position against the stocking.

4. A hosiery inspection device including a stocking supporting form having an end portion adapted to engage the toe end of a stocking, an element stationarily mounted on the form projecting laterally from the surface of the form rearwardly of, and in spaced relation to, the toe end portion for receiving the heel pocket of the stocking, actuating means including an actuating member, an element mounted on said actuating member for movement thereby and relative thereto opposite said stationary element for self adjusting position against the stocking, and means for adjusting said movable element relative to said actuating member.

5. A hosiery inspection device including a stocking supporting form having an end portion adapted to engage the toe end of a stocking, an element stationarily mounted on the form projecting laterally from the surface of the form rearwardly of, and in spaced relation to, the toe end portion for receiving the heel pocket of the stocking, and actuating means including an actuating member and a plurality of elements mounted on said actuating member for movement thereby and relative thereto opposite said stationary element for self adjusting position against the stocking.

6. A hosiery inspection device including a stocking supporting form having an end portion adapted to engage the toe end of a stocking, an element stationarily mounted on the form projecting laterally therefrom rearwardly of, and in spaced relation to, the toe end portion for receiving the heel pocket of the stocking, actuating means including an actuating member, a plurality of elements mounted on said actuating member for movement thereby and relative thereto opposite said stationary element for self adjusting position against the stocking, and means for adjusting the positions of said movable elements relative to said actuating member and to each other for selectively distributing the tension thereof against the stocking.

7. A hosiery inspection device including a stationary inner support, a longitudinally divided outer form for supporting a stocking, the divisions of which form have end portions adapted to engage the toe end of a stocking, said divisions being laterally movably mounted on said support, an element stationarily mounted on said support having a portion between adjacent of said divisions and a heel portion projecting laterally from the surface of the form rearwardly of, and in spaced relation to, the toe end thereof for receiving the heel pocket of the stocking, the form having a side depression laterally opposite said element into which an instep portion of the stocking is biased by the stationary element, an instep pressure member movable relative to the element, and means for moving said divisions laterally and also moving said member relative to the element against said inwardly-biased instep portion to pull the heel pocket into position on said element and apply tension to the fabric to expand the heel pocket a predetermined amount.

8. A hosiery inspection device including a stocking supporting form having an end portion adapted to engage the toe end of a stocking, a heel element stationarily mounted on the form projecting laterally from the surface of the form rearwardly of, and in spaced relation to, the toe end portion, the form having a side depression laterally opposite said element into which an instep portion of the stocking is biased by the stationary element, actuating means including an actuating member, a plurality of instep pressure elements mounted on said actuating member for movement thereby opposite said recess against said instep portion to pull the heel pocket into position on said stationary element and apply tension to the fabric to expand the heel pocket a predetermined amount, and means for selectively distributing the tension of said movable elements on the stocking along the form including means for adjusting said movable elements relative to said actuating member and to each other.

9. A hosiery inspection device including a stocking supporting form having an end portion adapted to engage the toe end of a stocking, a heel element stationarily mounted on the form projecting laterally from the surface of the form rearwardly of, and in spaced relation to, the toe end portion for receiving the heel pocket of the stocking, the form having a side depression laterally opposite said element into which an instep portion of the stocking is biased by the stationary element, and means for distending the stocking opposite said depression including an actuating member and a stocking engaging member carried by the actuating member in movable relation thereto for self adjusting position against the stocking.

10. A hosiery inspection device including a stocking supporting form having an end portion adapted to engage the toe end of a stocking, a heel element stationarily mounted on the form projecting laterally from the surface of the form rearwardly of, and in spaced relation to, the toe end portion for receiving the heel pocket of the stocking, the form having a side depression laterally opposite said stationary element into which an instep portion of the stocking is biased by the stationary element, actuating means including an actuating member, an element mounted on said actuating member for movement thereby and relative thereto opposite said recess for self adjusting position against the stocking, and means for adjusting said movable element relative to the actuating member.

11. A hosiery inspection device including a stocking supporting form having an end portion adapted to engage the toe end of a stocking, an element stationarily mounted on the form projecting laterally from the surface of the form rearwardly of, and in spaced relation to, the toe end portion for receiving the heel pocket of the stocking, the form having a side depression laterally opposite said element into which an instep portion of the stocking is biased by the stationary element, and actuating means including an actuating member and a plurality of elements mounted on said actuating member for movement thereby and relative thereto opposite said recess for self adjusting position against the stocking.

12. A hosiery inspection device including a stocking supporting form having an end portion adapted to engage the toe end of a stocking, a heel element stationarily mounted on the form projecting laterally therefrom rearwardly of, and in spaced relation to, the toe end portion for receiving the heel pocket of the stocking, the form having a side depression laterally opposite said stationary element into which an instep portion of the stocking is biased by the stationary element, actuating means including an actuating member, a plurality of elements mounted on said actuating member for movement thereby and relative thereto opposite said recess for self adjusting position against the stocking, and means for adjusting the positions of said movable elements relative to the actuating member and to each other for selectively distributing the tension thereof against the stocking.

13. An inspection device for an article of wearing apparel having a tubular part, including an elongated supporting form for the tubular part having a stationary riser element projecting laterally to the elongated form beyond the surface of the form over which the part is adapted to be disposed, and movable means operating laterally of the elongated form locally opposite said stationary riser element for expanding said part on said element.

14. A hosiery inspection device including a stocking supporting elongated form having a stationary riser element projecting laterally to the form beyond the surface of the form over which a shaped portion of a stocking fabric on the form is adapted to be disposed, means for selectively positioning said element along said form, and movable means operating laterally of the elongated form locally opposite said stationary riser element for pulling said shaped stocking portion into position on said element and applying tension to the fabric to expand said shaped stocking portion a predetermined amount.

15. A hosiery inspection device including a stocking supporting elongated form having a stationary riser element projecting laterally to the form beyond the surface of the form over which a shaped portion of a stocking fabric on the form is adapted to be disposed and a recess laterally opposite the projection into which a portion of a stocking on the form is biased by the projection, and movable means operating laterally of the elongated form locally opposite said stationary riser element and the recess for pulling said shaped stocking portion into position on said element and applying tension to the fabric to expand said shaped stocking portion a predetermined amount.

ALFRED E. ISCHINGER.